United States Patent

Nakata

[11] Patent Number: 5,575,935
[45] Date of Patent: Nov. 19, 1996

[54] LASER BEAM MACHINE

[75] Inventor: Yoshinori Nakata, Yamanashi, Japan

[73] Assignee: Fanuc Ltd., Yamanashi, Japan

[21] Appl. No.: 327,491

[22] Filed: Oct. 21, 1994

[30] Foreign Application Priority Data

Nov. 9, 1993 [JP] Japan .................................. 5-279199

[51] Int. Cl.$^6$ .................................................. B23K 26/00
[52] U.S. Cl. ............................ 219/121.61; 219/121.67; 364/474.08
[58] Field of Search ........................... 219/121.6, 121.61, 219/121.62, 121.63, 121.67, 121.72, 121.79, 121.81, 121.82, 121.83, 121.85; 364/191, 474.08, 474.22, 474.24

[56] References Cited

U.S. PATENT DOCUMENTS

| 4,870,560 | 9/1989 | Seki et al. | 364/191 |
| 4,914,599 | 4/1990 | Seki et al. | 364/474.08 |

FOREIGN PATENT DOCUMENTS

| 61-123490 | 6/1986 | Japan | 219/121.72 |
| 63-171282 | 7/1988 | Japan | 219/121.62 |
| 63-273580 | 11/1988 | Japan | 219/121.61 |
| 2-258184 | 10/1990 | Japan . | |
| 5-388 | 1/1993 | Japan . | |

*Primary Examiner*—Tu Hoang
*Assistant Examiner*—Gregory L. Mills
*Attorney, Agent, or Firm*—Staas & Halsey

[57] ABSTRACT

A laser beam machine easily prepares a data bank of machining conditions and also easily creates a machining program from the machining conditions. When a suitable trial machining condition D1 is derived, the trial machining condition D1 is stored in a memory area as the machining condition for a machining step concerned. The machining condition is stored in accordance with a signal entered by an operator to create a machining condition data bank. In addition, an output state data D2 of a laser oscillator obtained during laser beam machining according to the trial machining condition D1 is stored. A registration code is assigned to the machining condition and the stored output state data. A machining condition corresponding to a machining path specified in a generalized machining program $P_0$ is extracted from the machining condition data bank and the extracted machining condition is set in the generalized machining program to create a specific machining program P.

6 Claims, 5 Drawing Sheets

LASER BEAM MACHINE

BACKGROUND OF THE INVENTION

1. Field of the Invention

The present invention relates to a laser beam machine for carrying out laser beam machining in accordance with a predetermined machining program, and more particularly, to laser beam machine permitting an optimum machining program to be created with ease.

2. Description of the Related Art

Conventionally, when a machining program is created, the operator reserves extracted machining conditions in a data bank, and retrieves the required machining conditions therefrom to prepare a desired machining program. So far, using an automatic programming apparatus is substantially the only means to simplify the operations involved in this work.

Among the operations associated with the creation of a machining program, preparation of a data bank in which machining conditions are kept consumes labor. Even though a useful data bank can be created, there has been no practical measure to make good use of the created data bank.

Further, applying the machining conditions to the machining program also is labor-consuming work.

SUMMARY OF THE INVENTION

The present invention was created in view of the above circumstances, and an object thereof is to provide a laser beam machine which permits a data bank of machining conditions to be prepared easily and also permits a machining program to be created with ease by use of the machining conditions.

To achieve the above object, the present invention provides a laser beam machine for carrying out a laser beam machining operation in accordance with a predetermined machining program, which comprises machining condition data bank creating means for storing a suitable machining condition in a memory area when the suitable machining condition is derived during a trial machining operation of a workpiece, in accordance with a signal entered by an operator, to thereby create a machining condition data bank, and machining program creating means for extracting a machining condition corresponding to a machining path specified in a generalized machining program from the machining condition data bank, and for setting the extracted machining condition in the generalized machining program, to thereby create the predetermined machining program.

When a suitable machining condition is derived during trial machining of a workpiece, the machining condition data bank creating means stores the machining condition in the memory area in accordance with a signal entered by the operator, to thereby create a machining condition data bank. The machining program creating means extracts from the machining condition data bank a machining condition corresponding to a machining path specified in a generalized machining program, and sets the extracted machining condition in the generalized machining program, to thereby create a predetermined machining program.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be hereinafter described with reference to the drawings.

Figure 1:
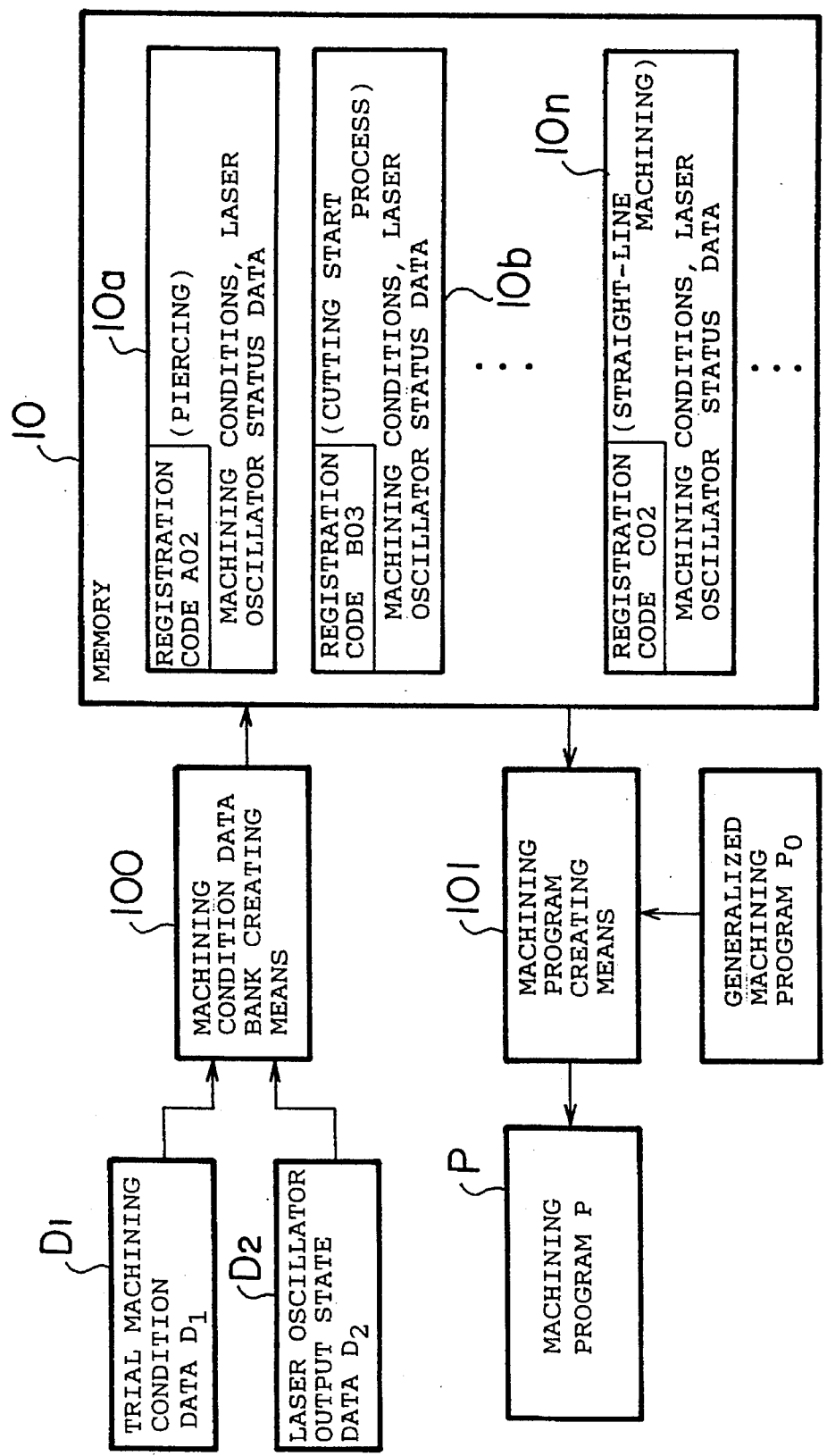
FIG. 1 is a block diagram illustrating the configuration of a laser beam machine according to the present invention.

FIG. 1 is a block diagram illustrating the configuration of a laser beam machine according to the present invention. In the stage of a trial machining performed on a workpiece, when a proper trial machining condition D1 suited for a machining step is derived, machining condition data bank creating means 100 stores the trial machining condition D1 in a corresponding one of registration areas 10a, 10b, ..., 10n of a memory 10 as the machining condition for the machining step concerned, in accordance with a signal entered by the operator, to thereby create a data bank of machining conditions.

Also, data D2 indicating the output state of a laser oscillator 4 (FIG. 5) during the laser beam machining according to the trial machining condition D1 is stored in the corresponding registration areas 10a, 10b, ..., 10n of the memory 10. Accordingly, the machining condition data bank is composed of the machining conditions and the output state data. The machining conditions and output state data thus stored are allotted respective registration code numbers. For example, a registration code number beginning with "A" is assigned to a machining step of piercing, a registration code number beginning with "B" is assigned to a cutting start process, and a registration code number beginning with "C" is assigned to straight-line machining.

Machining program creating means 101 creates a specific machining program P by combining a generalized machining program P0 including input machining paths with machining conditions extracted from the memory 10 and corresponding to the machining paths.

Figure 2:
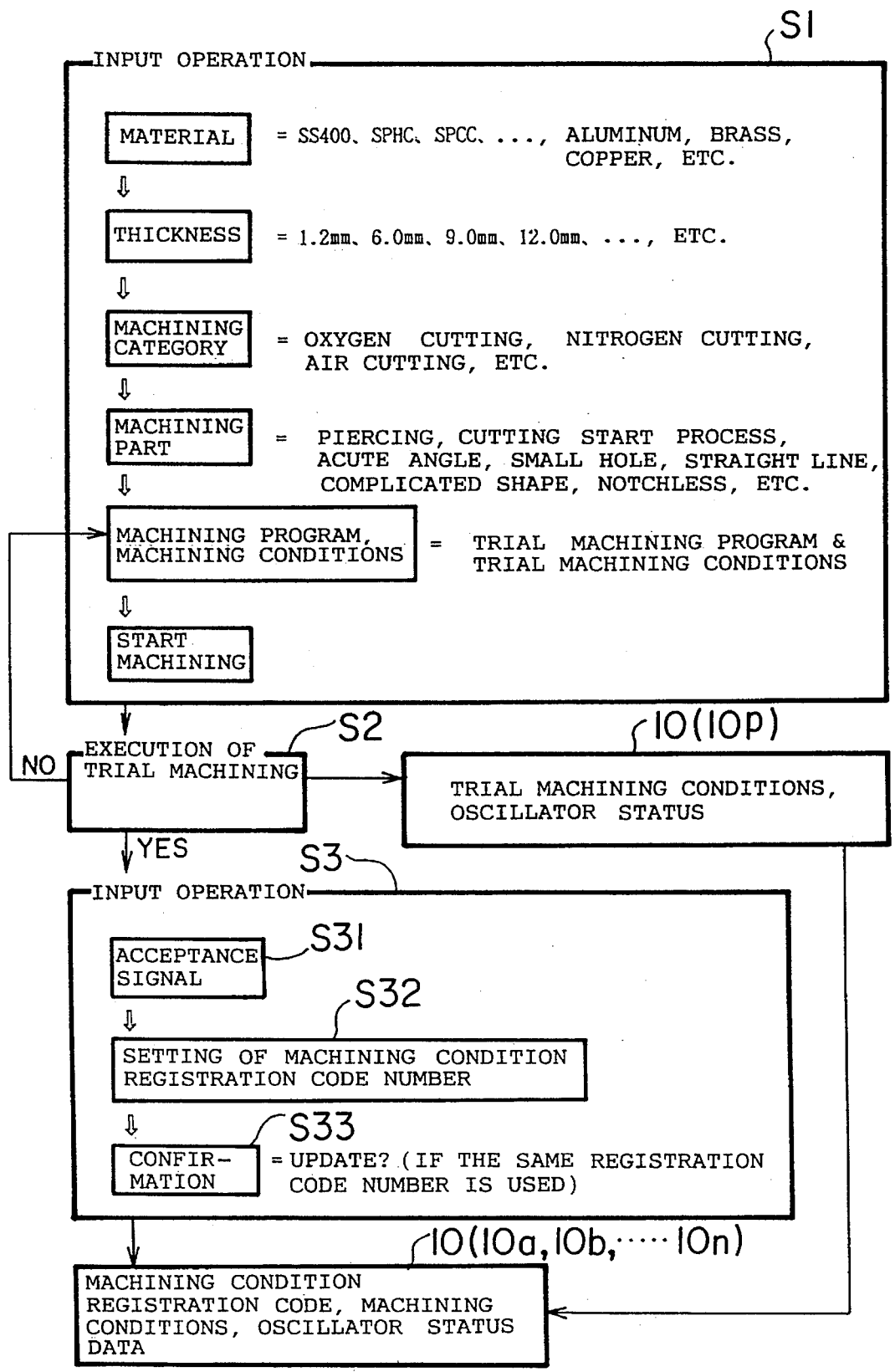
FIG. 2 is a diagram illustrating a procedure for creating a data bank of machining conditions.

FIG. 2 is a diagram illustrating a procedure for creating the machining condition data bank. The machining condition data bank is created through Step S1 for an input operation process, Step S2 for the execution of trial machining, and Step S3 for an input operation process. These steps are executed by a numerical control device (CNC) 1a, as described later.

Step S1 is the input operation process for carrying out a trial machining. In this step, the operator successively enters data about a material, thickness, machining category and machining part, specifies a trial machining program and trial machining conditions, and then enters a machining start signal. Here, the material denotes a workpiece material such as SS400, SPHC, SPCC or the like, the machining category denotes a machining type such as oxygen cutting, nitrogen cutting or the like, and the machining part denotes a process such as piercing, cutting start process, acute-angled machining or the like. The machining conditions include parameters determining the waveform of a laser beam, such as a pulse peak value, frequency, and duty factor.

Step S2 is the process for executing the trial machining. Each time a trial machining is carried out, the machining conditions then set for the trial machining and the output state of the laser oscillator 4 during the trial machining are stored in a predetermined area 10p of the memory 10. If the trial machining meets with good results, Step S3 is executed. If the results are no good, Step S1 is again executed, and trial machining is re-executed according to a modified trial machining program and modified machining conditions.

Step S3 is the process executed when the results of the trial machining are satisfactory. First, in Step S31, the operator enters an acceptance signal. When the acceptance signal is entered, a registration code number is assigned to the data stored in the predetermined area 10p of the memory 10 (Step S32), and the operator is prompted to make sure that the registration code number is not used for other data (Step S33). If the registration code number is already used for other data, the operator determines whether the registration code number should be updated or be used as it is.

After the confirmation is made, the machining conditions and output state data of the laser oscillator 4, stored in the predetermined area 10p of the memory 10, are transferred to the registration areas 10a, 10b, . . . , 10n of the memory 10. In this manner, the machining condition data bank is created in the memory 10.

Figure 3:
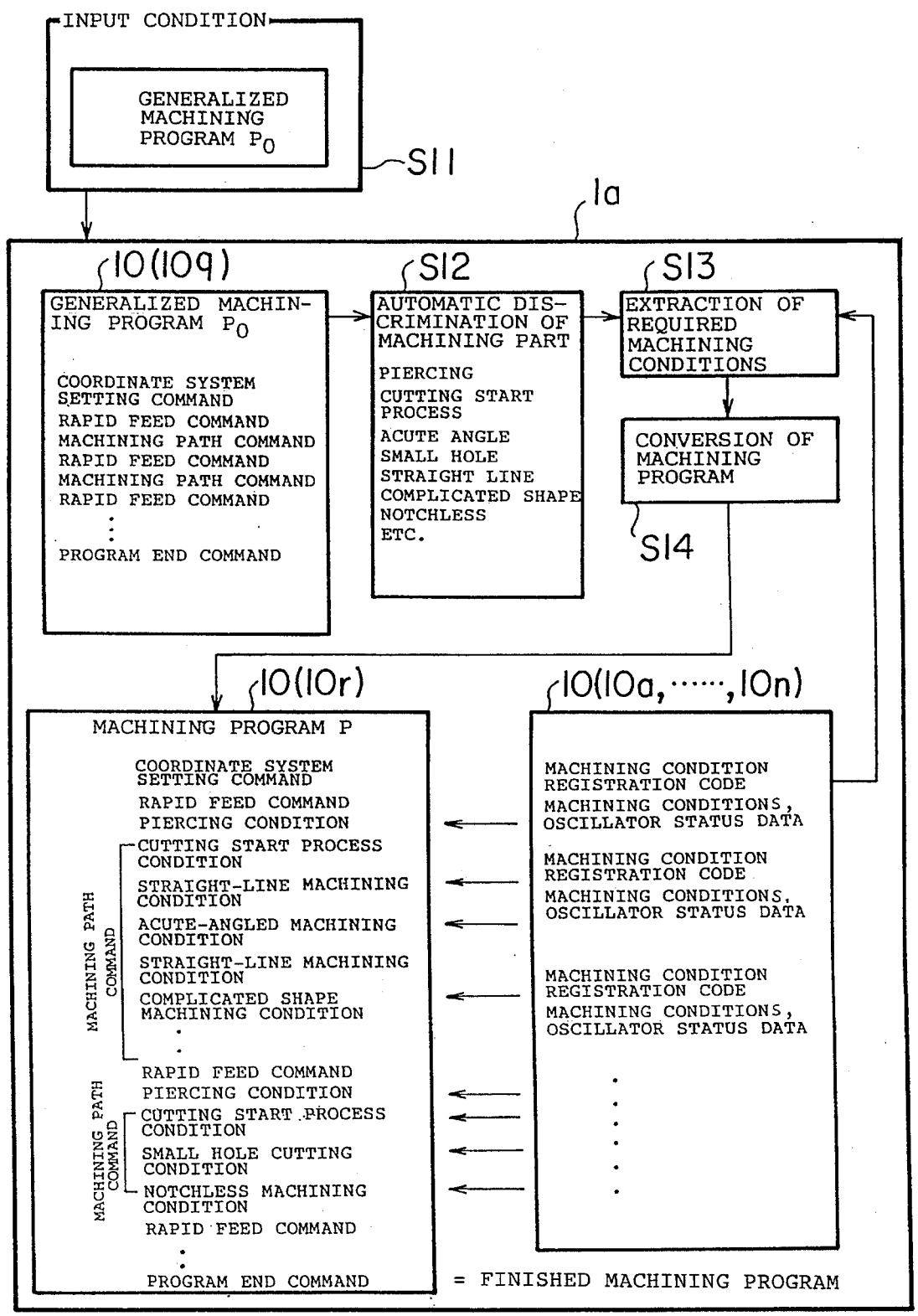
FIG. 3 is a diagram illustrating a procedure for creating a machining program.

FIG. 3 is a diagram illustrating a procedure for creating the machining program. The machining program P used for an actual machining operation is created through Step S11 for an input operation process, Step S12 for automatic discrimination of a machining part, Step S13 for extraction of required machining conditions, and Step S14 for machining program conversion.

In the input operation process of Step S11, the operator enters the generalized machining program P0. The generalized machining program P0 is composed mainly of machining paths, as mentioned above, and also includes code names of commands for executing the machining process, e.g., code names specifying coordinate system settings, rapid feed, piercing, and cutting start. The generalized machining program P0 is stored in a predetermined area 10q of the memory 10 within the CNC 1a.

In the subsequent Step S12, the machining part is automatically discriminated based on the code name in the generalized machining program P0. Namely, the required machining step, e.g., piercing, cutting start process, acute-angled machining, small hole cutting, straight-line machining, complicated shape machining, or notchless machining, is discriminated.

In Step S13, machining conditions necessary for the respective machining parts discriminated in Step S12 are extracted. Specifically, the registration code numbers corresponding to the respective machining parts and the machining conditions associated with these code numbers are extracted from the machining condition data bank stored in the registration areas 10a, 10b, . . . , 10n of the aforementioned memory 10. As mentioned above, the machining conditions include the parameters determining the laser beam waveform, i.e., pulse peak value, frequency, and duty factor.

In Step S14, the generalized machining program P0 is converted such that it includes the extracted registration code numbers and machining conditions, whereby a final machining program P is obtained. The machining program P is stored in a predetermined area 10r of the memory 10 as a finished machining program.

Figure 4:
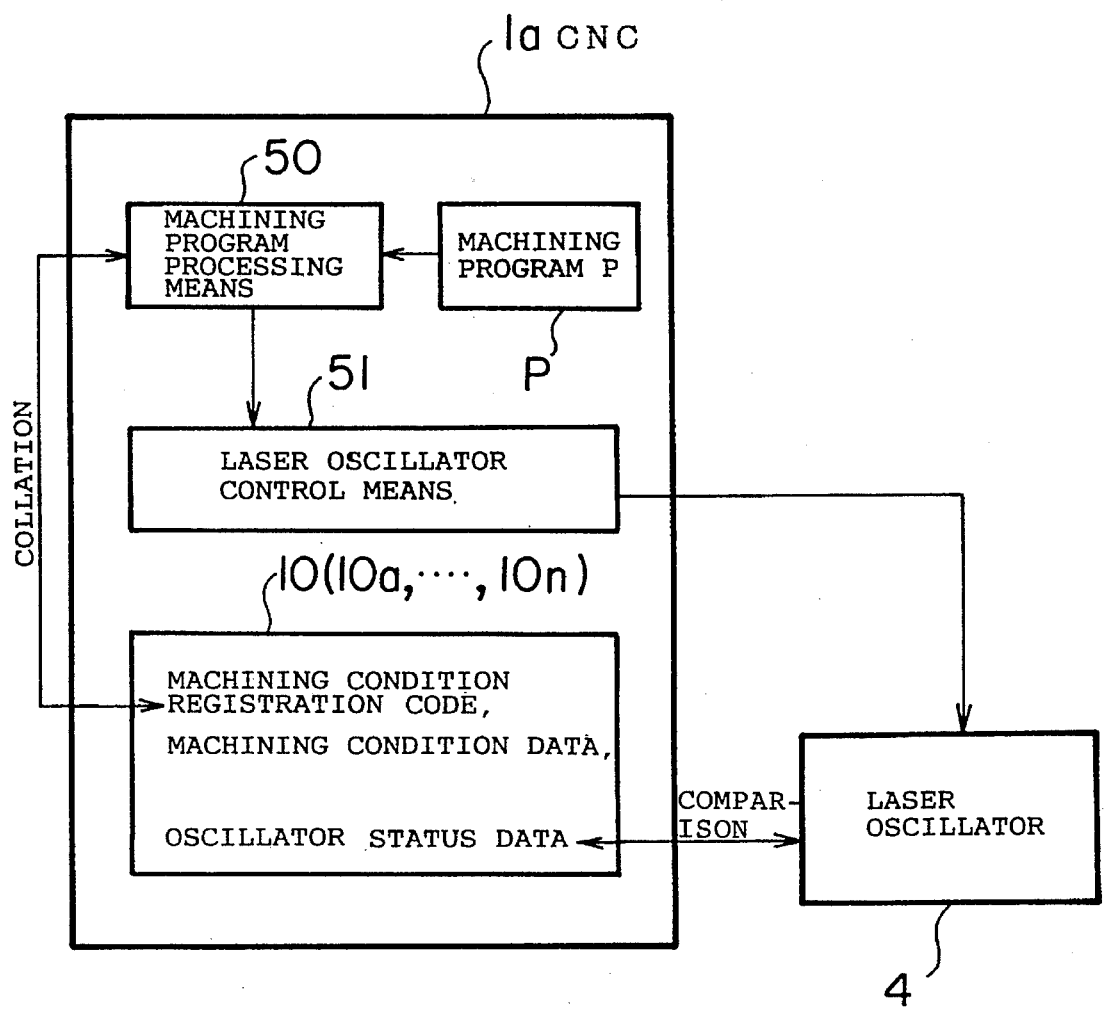
FIG. 4 is a diagram illustrating an actual control procedure for a laser oscillator.

FIG. 4 is a diagram illustrating actual control of the laser oscillator. The operation of the laser oscillator 4 is actually controlled in the following manner: First, in the CNC 1a, machining program processing means 50 reads the created machining program P. In accordance with the machining program P, laser oscillator control means 51 outputs a drive signal to the oscillator 4 and thereby controls the operation thereof.

When the machining program P is read, the registration code numbers are collated with those stored in the registration areas 10a, 10b, . . . , 10n of the memory 10, and the oscillator status data associated with the individual registration code numbers is read. The oscillator status data is compared with data indicating an actual output state of the laser oscillator 4, and the laser oscillator 4 is controlled in such a manner that it maintains a state in which optimum machining conditions are achieved.

Figure 5:
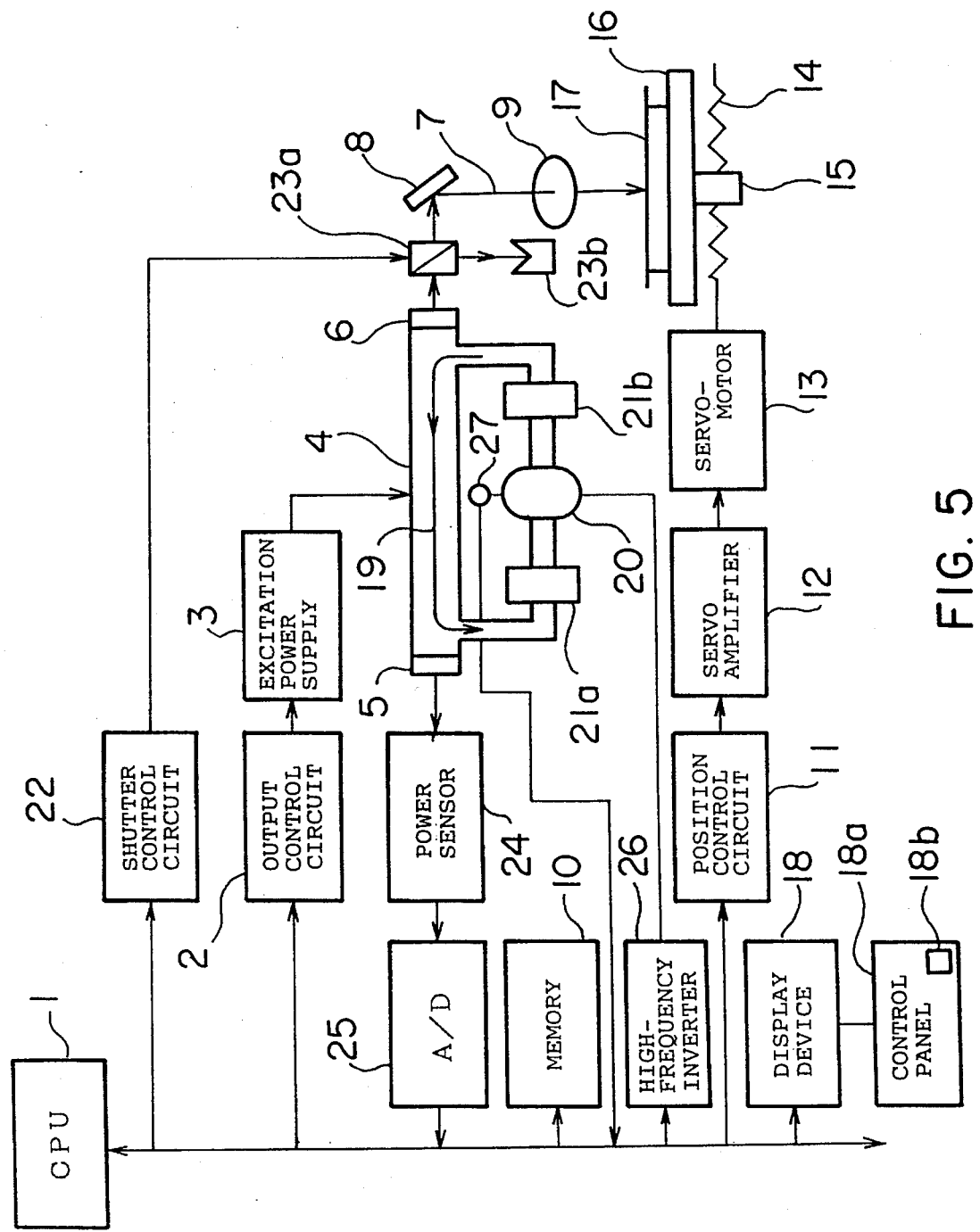
FIG. 5 is a diagram illustrating the entire arrangement of the laser beam machine according to the present invention.

FIG. 5 is a diagram illustrating the entire arrangement of a laser beam machine according to the present invention. Referring to the figure, a processor (CPU) 1 reads the machining program stored in the memory 10, and controls the entire operation of the laser beam machine in accordance with a control program stored in a ROM, not shown. The memory 10 includes a plurality of memory areas, i.e., the aforesaid registration areas 10a, 10b, . . . , the predetermined area 10p, etc.

An output control circuit 2 has a D/A (digital/analog) converter built therein and converts an output command value supplied from the processor 1 to a current command value. An excitation power supply 3 rectifies commercial electric power, then performs a switching operation to generate a high-frequency voltage, and supplies a discharge tube 4 with a high-frequency current corresponding to the current command value.

Laser gas 19 circulates within the discharge tube 4. When applied with the high-frequency voltage from the excitation power supply 3, the discharge tube 4 produces electric discharge, which excites the laser gas 19. A rear mirror 5 is made of germanium (Ge) and has a reflectance of 99.5[%], and an output mirror 6 is made of zinc selenide (ZnSe) and has a reflectance of 65[%]. The mirrors 5 and 6 constitute a stabilized resonator and amplify 10.6 [μm] light emitted from the molecules of the excited laser gas, part of the light being output through the output mirror 6 to the outside as a laser beam 7.

When a shutter 23a, mentioned later, is open, the output laser beam 7 is deflected by a bender mirror 8, then converged to a beam spot diameter of 0.2 [mm] or less by a light converging lens 9, and irradiated onto the surface of a workpiece 17.

The memory 10 is a nonvolatile memory for storing the machining program, various parameters and the like. For example, a CMOS backed up by a battery, not shown, is used for the memory 10. Although the laser beam machine includes other memories such as a ROM storing system programs and a RAM for temporarily storing data, these memories are omitted from FIG. 5.

A position control circuit 11 controls the rotation of a servomotor 13 through a servo amplifier 12 in accordance with a command from the processor 1. Consequently, movement of a table 16 is controlled by means of a ball screw 14 and a nut 15, and thus the position of the workpiece 17 is controlled. Although FIG. 5 illustrates only one axis, in practice the laser beam machine has a plurality of control axes.

A display device 18 comprises a CRT, liquid crystal display device or the like. The display device 18 is provided with a control panel 18a including a keyboard etc., and the aforementioned input operations are performed using the control panel 18a. The control panel 18a has a button 18b for the entry of the acceptance signal. When suitable machining conditions are derived during trial machining, the operator presses this button 18b to input the acceptance signal.

A blower 20 comprises a Roots blower and causes the laser gas 19 to circulate through cooling units 21a and 21b. The cooling unit 21a serves to cool the laser gas 19 whose temperature has risen due to laser pumping, and the cooling unit 21b serves to remove heat generated due to compression of the gas by the blower 20.

A shutter control circuit 22 opens and closes the shutter 23a in accordance with a command from the processor 1. The shutter 23a comprises a copper plate or aluminum plate having a surface thereof plated with gold. When the shutter 23a is closed, the laser beam 7 output from the output mirror 6 is reflected toward a beam absorber 23 to be absorbed thereby, and when the shutter 23a is open, the laser beam 7 passes therethrough and is irradiated onto the workpiece 17.

A power sensor 24 comprises a thermoelectric or photoelectric converting element, for example, and is supplied with part of the laser beam transmitted through the rear mirror 5 to measure the output power of the laser beam 7. An A/D converter 25 converts the output of the power sensor 24 to a digital value, which is then supplied to the processor 1. In this embodiment, as described above, when suitable machining conditions are derived during trial machining, they are stored in the machining condition data bank, and when a machining program is actually created, the stored machining conditions are fetched to prepare a desired machining program P. The storing of machining conditions into the machining condition data bank is effected in response to the acceptance signal, which is generated, e.g., when the operator presses the button. Accordingly, the operator can create a data bank without performing complicated operations.

Further, the operator has only to create a generalized machining program P0 to obtain a machining program P reflecting optimum machining conditions; therefore, a laser beam machining equivalent to that achievable by delicate setting of machining conditions by a skilled person can be carried out.

Also, the operating state of the laser oscillator 4 is controlled in the same manner as to provide the optimum machining conditions, and accordingly, machining errors attributable to erroneous control action can be almost perfectly eliminated.

As described above, according to the present invention, when suitable machining conditions are derived during trial machining, they are stored in the machining condition data bank, and when a machining program is actually created, the stored machining conditions are fetched to prepare a desired machining program. The storing of machining conditions into the machining condition data bank is effected in response to the acceptance signal, which is generated, e.g., when the operator presses the button. Thus, the operator can create a data bank without performing complicated operations.

Further, a machining program adopting optimum machining conditions is automatically created based on a generalized machining program. Accordingly, the operator has only to create a generalized machining program to obtain a machining program employing the optimum machining conditions, and a laser beam machining equivalent to that achievable by delicate setting of machining conditions by a skilled person can be executed.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A laser beam machine for carrying out a laser beam machining operation in accordance with a predetermined machining program, comprising:

machining condition data band creating means for storing a suitable machining condition in a memory area when the suitable machining condition is derived during a trial machining operation of a workpiece, in accordance with a signal entered by an operator, to thereby create a machining condition data bank;

machining program creating means for extracting a machining condition corresponding to a machining path specified in a generalized machining program, from the machining condition data bank, and setting the extracted machining condition in the generalized machining program, to thereby create the predetermined machining program;

laser oscillator control means for outputting a drive signal in response to the predetermined machining program;

a laser beam oscillator which machines the workpiece with a laser beam in response to the drive signal output from the laser oscillator control means; and direct means for directing the laser beam to the workpiece to machine the workpiece.

2. The laser beam machine according to claim 1, wherein said machining condition data bank creating means stores the machining condition with a registration code number assigned thereto.

3. The laser beam machine according to claim 1, wherein said machining condition data bank creating means stores the machining condition for each machining step.

4. The laser beam machine according to claim 1, wherein said machining condition data bank creating means stores, in addition to the machining condition, actual output state data of a laser oscillator associated with the machining condition, in the memory area.

5. The laser beam machine according to claim 4, wherein an output state of the laser oscillator during an actual machining operation is compared with the output state data stored in the memory area, and the actual output state is corrected and controlled so as to match with the output state data stored in the memory area.

6. The laser beam machine according to claim 1, wherein the machining condition comprises a plurality of different parameters determining a laser beam waveform.

* * * * *